J. G. HEASLET.
CASING FOR UNIVERSAL JOINTS FOR AUTOMOBILES.
APPLICATION FILED JULY 27, 1910.
1,024,132. Patented Apr. 23, 1912.
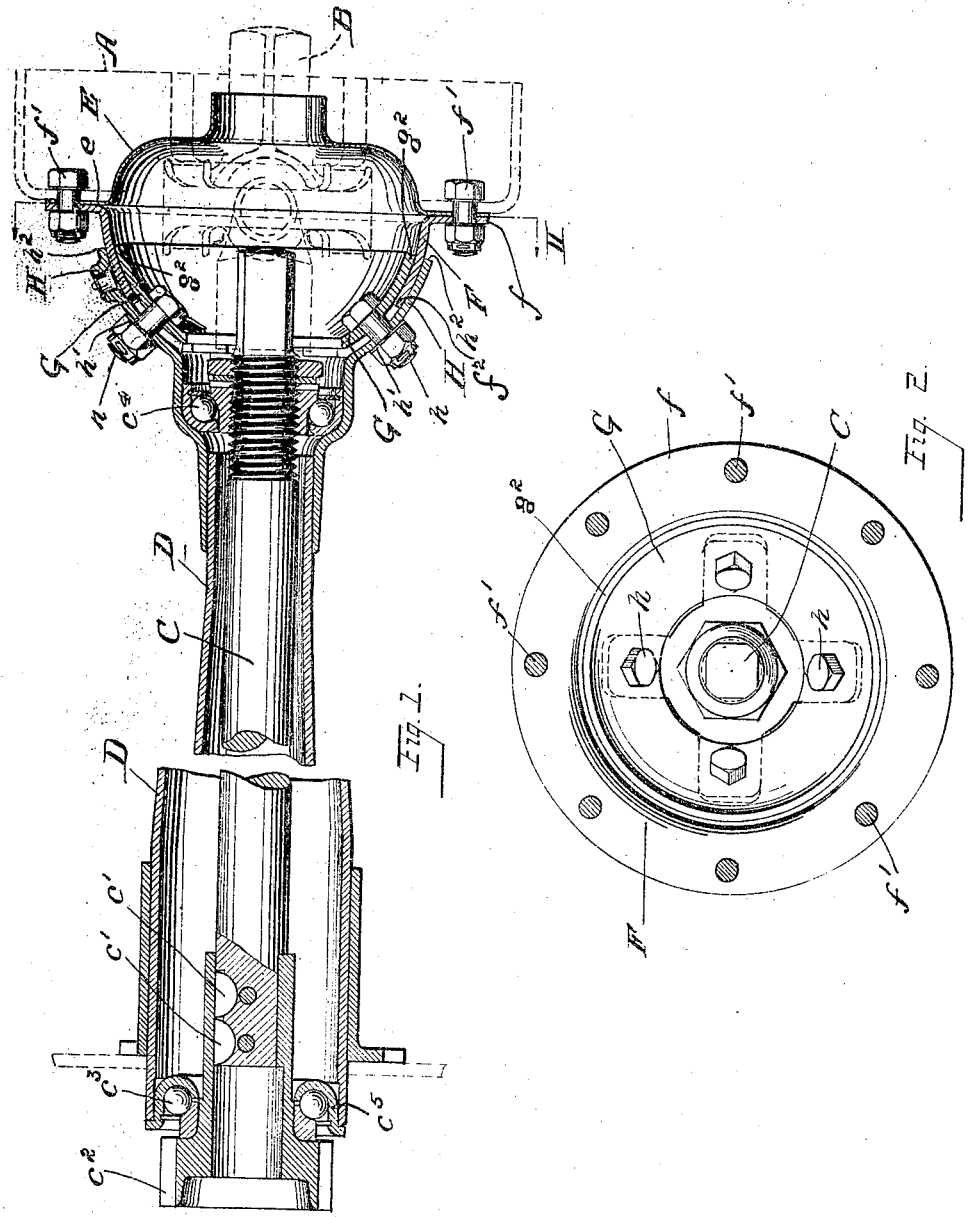

UNITED STATES PATENT OFFICE.

JAMES G. HEASLET, OF DETROIT, MICHIGAN, ASSIGNOR OF ONE-HALF TO WALTER E. FLANDERS, OF PONTIAC, MICHIGAN.

CASING FOR UNIVERSAL JOINTS FOR AUTOMOBILES.

1,024,132.  Specification of Letters Patent.   Patented Apr. 23, 1912.

Application filed July 27, 1910.  Serial No. 574,131.

*To all whom it may concern:*

Be it known that I, JAMES G. HEASLET, a citizen of the United States, resident of Detroit, county of Wayne, and State of Michigan, have invented a new and useful Improvement in Casings for Universal Joints for Automobiles, of which the following is a specification, the principle of the invention being herein explained and the best mode in which I have contemplated applying that principle, so as to distinguish it from other inventions.

My invention has reference to torque tube joints for automobiles, and more particularly to a movable connection which, while fully meeting all the practical demands for flexibility, shall permit of being more readily assembled and disassembled than was, so far as I am aware, heretofore possible. It is, then, the fulfilment of these two purposes which this invention has for an object, and toward the accomplishment of which it consists of means hereinafter fully described and particularly pointed out in the claims.

The annexed drawing and the following description set forth in detail one mode of carrying out my invention, the disclosed means, however, constituting but one of various mechanical forms in which the principle of my invention may be applied.

In said annexed drawing: Figure 1 is a horizontal section of a torque tube joint embodying my invention. Fig. 2 is a vertical section on line II—II of Fig. 1, looking in the direction of the arrows.

Referring to the drawing in which like letters and numerals of reference refer to like parts throughout, a portion of the frame A, in this instance one of the cross-members thereof, sufficient for the purpose of indicating how the structure as a whole may be attached thereto, is represented in dotted lines. Member B, also shown in dotted lines, connects with the engine crank shaft, not shown, as will be readily understood, and this member is interiorly connected with the driving shaft C through the medium of the usual universal joint, likewise indicated in dotted lines in Fig. 1. The shaft C is suitably keyed at $c'$, $c'$, whereby it may directly rotate the transmission gear member $c^2$. Suitable ball bearings $c^3$ and $c^4$ are positioned at the ends of the shaft for reasons obvious to those skilled in the art. A main longitudinal housing D incloses the shaft throughout the greater portion of its length, and is supported at one end by the bearing cup $c^5$, as will be readily understood.

A cup-shaped inclosing cap E provided with an annular flange $e$, by means of which it may be secured at a sufficient number of points to the frame A, is adapted to serve as a housing for approximately one-half of the universal joint as shown. A spherical casing F is likewise provided with an annular flange $f$, of corresponding size. These flanges are adapted to abut each other, and thus permit of being simultaneously fastened to the frame by suitable bolts $f'$ $f'$. The casing F is also preferably of spherical shape and, fastened as stated, coöperates with the cap E to effect with it a close and fixed joint. Interiorly adjacent of this casing F, and extending beyond the edge thereof, is a housing member G of corresponding spherical shape.

Exteriorly adjacent to the spherical casing F and having its one end of like curvature as this casing and the under-lying housing G, is another housing member H. These two housing members G and H conforming, then, to opposite sides of the casing, inclose the latter, as will be evident from an inspection of Fig. 1. A plurality of bolts $h$ $h$, having spring washers $h'$ $h'$ connect these two housing members so as to yieldingly clamp the casing F between them. As now becomes obvious, the loosening of the bolts $f'$ $f'$ and $h$ $h$ will permit a ready and simple disassembling for the purpose of repair or cleansing of the parts.

It should be noted that in normal position, that is with the member B and shaft C in substantial alinement, the annular edge $f^2$ of the casing will be a sufficient distance both from the bolts $f'$ and from the two oppositely disposed edges $g^2$ and $h^2$, to safely permit of any relative movement between them within the range of practical probability.

The operation of the construction is now manifestly as follows:—Any movement, either on the part of the frame A as directly transmitted to the casing F, or on the part of the housing member D as directly transmitted to the spherical housing H, will cause a relative sliding of the casing between the housing members G and H, and, in fact, in any direction within the prescribed limits.

Having fully described my invention, what I claim and desire to secure by Letters Patent is:—

1. In a casing for universal joints, a casing member, a two sectioned housing coöperating therewith, a plurality of bolts connecting said sections, and resilient means coöperating with said bolts and one of said sections whereby said casing member and said housing may be moved relative to each other.

2. In a casing for universal joints, the combination of a fixed casing member, a housing member coöperating interiorly with said casing member, a second housing member coöperating exteriorly with said casing member, bolts connecting said housing members and spring washers coöperating with said bolts and the outer housing member whereby said housing members may be moved relative to said casing member.

3. In a casing for universal joints, the combination of a frame, a spherical casing member fixed to said frame, a spherical housing member interiorly adjacent and extending beyond said casing member, a second housing member comprising a spherical portion exteriorly adjacent to said casing member and overlying said first mentioned housing member, means comprising a plurality of bolts connecting said housing members, and resilient means coöperating with said bolts and one of said housing members whereby said housing member may be moved relative to said casing member.

4. In a casing for universal joints, the combination of a frame, a cap member secured to said frame, a casing member secured to said frame and cap and coöperating with the latter, a two sectioned housing member coöperating with said casing member, spaced apart members passing radially through said housing sections, and resilient means coöperating with said spaced apart members and one of said housing sections whereby said casing member and housing sections may be moved relative to each other.

Signed by me, this 26th day of July, 1910.

JAMES G. HEASLET.

Attested by—
  JAMES E. SPENCER,
  FRANK A. BATES.